US010739780B1

(12) United States Patent
Silver et al.

(10) Patent No.: US 10,739,780 B1
(45) Date of Patent: Aug. 11, 2020

(54) DETECTING STREET PARKED VEHICLES

(71) Applicant: Waymo LLC, Mountain View, CA (US)

(72) Inventors: David Harrison Silver, San Carlos, CA (US); Jur Pieter Van Den Berg, San Francisco, CA (US); Nathaniel Fairfield, Mountain View, CA (US)

(73) Assignee: WAYMO LLC, Mountain View, CA (US)

( * ) Notice: Subject to any disclaimer, the term of this patent is extended or adjusted under 35 U.S.C. 154(b) by 316 days.

(21) Appl. No.: 15/939,468

(22) Filed: Mar. 29, 2018

Related U.S. Application Data

(63) Continuation of application No. 15/384,841, filed on Dec. 20, 2016, now Pat. No. 9,964,954, which is a continuation of application No. 14/681,424, filed on Apr. 8, 2015, now Pat. No. 9,557,736.

(51) Int. Cl.
*G05D 1/02* (2020.01)
*G08G 1/16* (2006.01)
*G05D 1/00* (2006.01)

(52) U.S. Cl.
CPC ......... *G05D 1/0231* (2013.01); *G05D 1/0088* (2013.01); *G05D 1/0234* (2013.01); *G08G 1/165* (2013.01)

(58) Field of Classification Search
None
See application file for complete search history.

(56) References Cited

PUBLICATIONS

Kiyotaka Hirahara and Katsushi Ikeuchi, Detection of Street-Parking Vehicles Using Line Scan Camera and Scanning Laser Range Sensor, <http://citeseerx.ist.psu.edu/viewdoc/download?doi=10.1.1.78.3748&rep=rep1&type=pdf>.
Douglas A. Thornton, Dr. Keith Redmill, and Dr. Benjamin Coifman, Automated Parking Surveys from a LIDAR Equipped Vehicle, <http://www2.ece.ohio-state.edu/~coifman/documents/LidarPark.pdf>.
Chris Urmson, Autonomous Driving in Urban Environments: Boss and the Urban Challenge, <http://www.fieldrobotics.org/users/alonzo/pubs/papers/JFR_08_Boss.pdf>.

*Primary Examiner* — Bhavesh V Amin
(74) *Attorney, Agent, or Firm* — Botos Churchill IP Law

(57) ABSTRACT

Aspects of the disclosure relate to an autonomous vehicle that may detected other nearby vehicles and identify them as parked or unparked. This identification may be based on visual indicia displayed by the detected vehicles as well as traffic control factors relating to the detected vehicles. Detected vehicles that are in a known parking spot may automatically be identified as parked. In addition, detected vehicles that satisfy conditions that are indications of being parked may also be identified as parked. The autonomous vehicle may then base its control strategy on whether or not a vehicle has been identified as parked or not.

20 Claims, 7 Drawing Sheets

DETECTING STREET PARKED VEHICLES

CROSS-REFERENCE TO RELATED APPLICATIONS

The present application is a continuation of U.S. patent application Ser. No. 15/384,841, filed Dec. 20, 2016, which is a continuation of U.S. patent application Ser. No. 14/681,424, filed Apr. 8, 2015 issued as U.S. Pat. No. 9,557,736 on Jan. 31, 2017, the disclosure of which is incorporated herein by reference.

BACKGROUND

The general behavior of an autonomous vehicle is to stay in its lane and keep a safe distance from the vehicle in front of it. However, this assumes that the lead vehicle is moving as part of traffic.

BRIEF SUMMARY

In the case of vehicles parked on the street (e.g., not in parking spaces physically separated from a lane of travel), it is necessary to make the distinction between parked and unparked vehicles to prevent treating a vehicle that is not going to move in the near future as part of moving traffic. The autonomous vehicle may then determine the proper control strategy based on the distinction (e.g., yielding to an unparked car, but navigating around a parked car).

It is important that this distinction be made with high accuracy. Every false negative (i.e., a parked vehicle marked as unparked) is a chance to get stuck, and every false positive (i.e., an unparked vehicle marked as parked) may result in trying to cut off a moving vehicle. This distinction must also be made with low latency. Waiting too long to call a vehicle parked may result in unnecessary braking, and waiting too long to stop calling a vehicle parked could result in a collision or a near miss.

One aspect of the disclosure provides a method for identifying parked vehicles. The method includes detecting, by one or more computing devices, a first set of vehicles; identifying, by the one or more computing devices, a second set of vehicles, the vehicles in the second set being one or more vehicles in the first set having zero velocity; detecting, by the one or more computing devices, one or more visible indicia of the second set of vehicles; identifying, by the one or more computing devices, one or more traffic control factors relating to the second set of vehicles; identifying, by the one or more computing devices, a third set of vehicles as parked, the vehicles in the third set being one or more vehicles in the second set that are located in a parking spot; identifying, by the one or more computing devices, a fourth set of vehicles as parked, the vehicles in the fourth set being one or more vehicles in the second set but not in the third set that, for a length of time, satisfies two or more of a plurality of conditions indicative of being parked; and controlling, by the one or more computing devices, an autonomous vehicle in accordance with a control strategy corresponding to an identification of a vehicle in the first set. In one example, the first length of time is determined according to an estimated speed of each vehicle prior to having zero velocity.

In another example, a vehicle is determined to be located in a parking spot if it is at least: (i) located in a traffic control location associated with being parked, or (ii) within a first distance from a side of a road and outside a second distance from an intersection. In this example, the first distance is determined according to a width of the road and the second distance is determined according to one or both of traffic control lines and traffic control signs.

In yet another example, the plurality of conditions indicative of being parked comprises at least one of: (1) being at a traffic control location associated with being parked, (2) being within a third distance from a side of a road, (3) being outside a fourth distance from an intersection, (4) having zero velocity for a second length of time, (5) lacking visual indicia for hazard lights, brake lights, reverse lights, and turn signals, (6) facing a first angle in relation to a side of a road, (7) having a first width of space on a side of a vehicle furthest from a side of a road, (8) being at a type of intersection that does not require slowing or stopping, (9) being in a group of vehicles having zero velocity and being within the third distance and at the first angle from a side of a road, and (10) having no change in a size of a portion of a vehicle detected by the one or more computing devices. In this example, the third distance is determined according to a width of a road; the fourth distance is determined according to one or both of traffic control lines and traffic control signs; the second length of time is determined according to an estimated speed of a vehicle prior to having zero velocity; and the first width of space is determined according to an estimated width of a vehicle. Furthermore, in this example, the third distance, the fourth distance, the second length of time, and the first width of space are ranges of values. Also in this example, the first angle is an angle or a range of angles between 0° and 90°.

In yet another example, the method of identifying parked vehicles also includes updating, by the one or more computing devices, vehicles in the second set of vehicles continuously; updating, by the one or more computing devices, one or more of the visual indicia of the second set of vehicles continuously; and identifying, using the one or more computing devices, the vehicles in the second set as parked according to the updated visual indicia.

In still another example, the detection of the one or more visible indicia includes identifying one or more lights emitted from a vehicle. In this example, the one or more lights comprises at least one of the following: turn signals, hazard lights, emergency vehicle lights, and construction warning lights. In addition, the identification of a vehicle as possibly parked corresponding to the one or more lights.

Another aspect of the disclosure provides a system that includes an autonomous vehicle and one or more computing devices. This system is configured to perform the methods set forth above. Yet another aspect of the disclosure provides a non-transitory computer-readable medium on which instructions are stored, the instructions, when executed by one or more computing devices cause the one or more computing devices to perform the disclosed methods for identifying parked vehicles.

DETAILED DESCRIPTION

Overview

Figure 1:
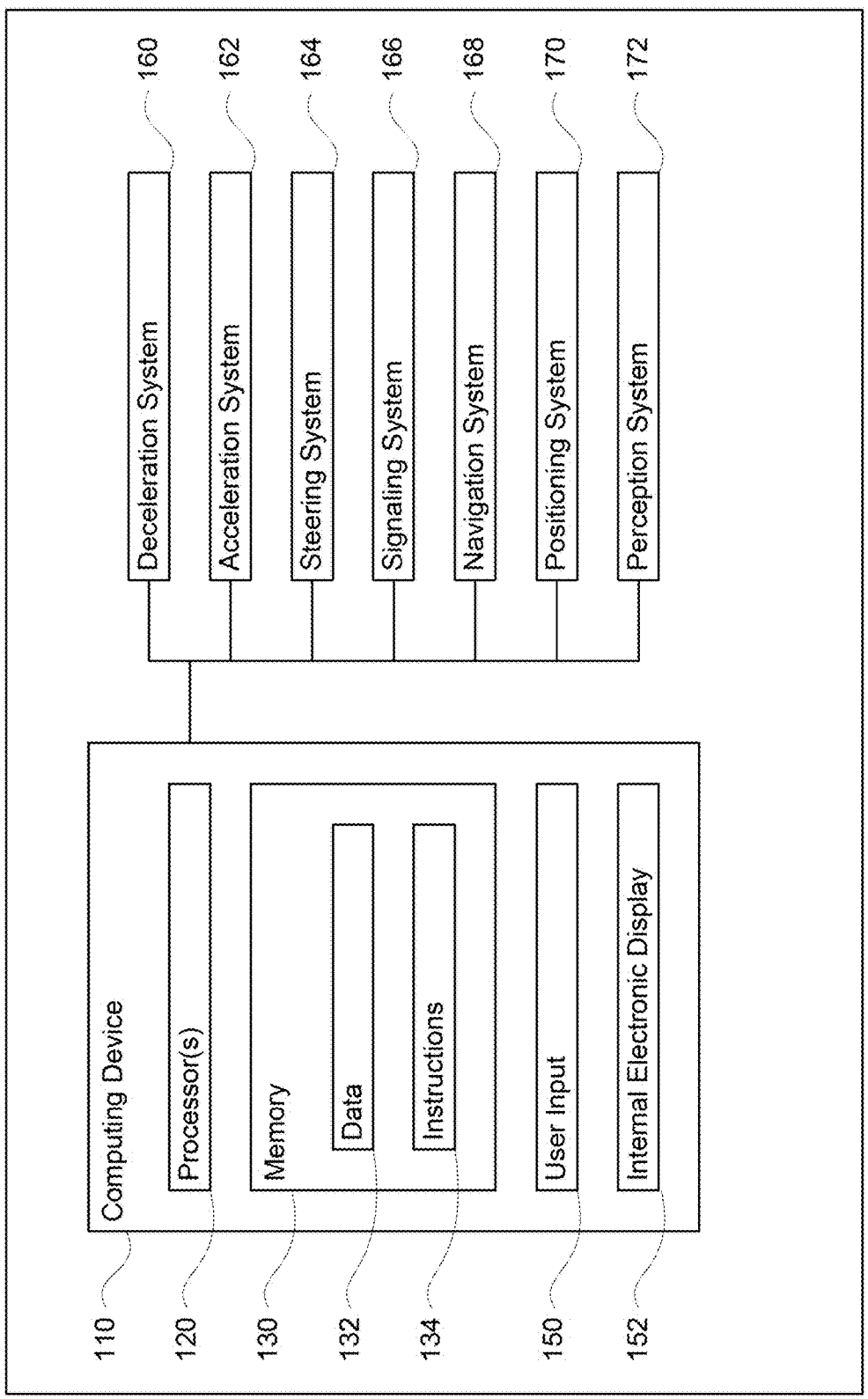
FIG. 1 is a functional diagram of a system in accordance with aspects of the disclosure.

An autonomous vehicle may determine whether a detected stationary vehicle is parked or part of the traffic flow. Vehicles that are in delineated parking spaces or against street curbs may be identified as parked. Additionally, vehicles that satisfy a number of other conditions may be labeled as possibly parked, tracked for a period of time, then labeled as parked if the conditions remain consistent with a parked vehicle. For example, if a car is stopped close to a curb, with a heading parallel to the street, with enough space on the other side for other vehicles to pass by, in a location where street parking is allowed, in a row of other vehicles similarly stopped, the system may determine that the car is parallel parked and label it as such. On the other hand, if a car is stopped close to an intersection where there is a stop sign, only for a short period of time, with a turn signal on, where the curb is painted red or yellow, the system may determine that the car is waiting to turn and therefore may label the car as not parked. Identifying a vehicle as parked may indicate that it is likely not going to move anytime soon and therefore the autonomous vehicle would have time to take actions to avoid the parked vehicle, such as passing or maneuvering around the parked vehicle. Meanwhile, when a vehicle is not identified as parked, the autonomous vehicle may treat the vehicle as part of traffic and/or monitor the movements of the vehicle more closely so as to be able to respond to its movements properly. For example, the autonomous vehicle may stop behind it and wait for it to move.

After detecting surrounding objects and tracking their movements, an autonomous vehicle may identify objects that are capable of moving but are currently stationary. These objects may be other vehicles on the road. The autonomous vehicle may also determine the type of stationary state of the detected vehicles. In accordance with one aspect of the disclosure, the types of stationary states may include a short-term stationary state and a long-term stationary state. The short-term stationary state may indicate that the vehicle is not parked and therefore likely to begin moving in the near future, while the long-term stationary state may indicate that the vehicle is parked and not likely to begin moving anytime soon.

From the detected stationary vehicles, an autonomous vehicle may identify one or more vehicles that have any visible indicia associated with a particular type of stationary state. The autonomous vehicle detect and identify lights such as hazard lights, emergency vehicle lights, construction warning lights, turn signals, brake lights, and reverse lights. Each type of lights may be associated with a parked or unparked state, and therefore may be used in this determination.

In addition, the autonomous vehicle may identify one or more traffic control factors relating to one or more of the vehicles. The autonomous vehicle may compare the location of detected stationary vehicles with map data such as type of roadway, type of intersection, lane of travel, location of parking spaces, or other traffic pattern. The map data may also include the location of parking spaces and no park zones, the color of the curb, city ordinances regarding parking, or other information related to parking. This information included in the map data may also be associated with a vehicle based on its determined location.

If the autonomous vehicle determines that one or more detected vehicles are located in a designated parking space, the autonomous vehicle may determine that the vehicle is in a parked state and labeled as parked in the system. Designated parking spaces may be parking spaces or parking lots delineated on the map data. Designated parking spaces may also include areas where curbside parking is permitted, which are usually within a certain distance from the curb and a certain distance from an intersection. The acceptable distance away from an intersection to park ranges depending on the layout of the intersection. For example, indicators such as the type of line delineating the shoulder and the color of the curb may be used to determine what the acceptable distance is for a particular intersection. City ordinances relevant to parking areas may also be used for the determination.

Detected vehicles that are not in a designated parking space may still be labeled as parked if they display characteristics of a parked vehicle for a period of time. The detected vehicles may be in a paved or unpaved shoulder, a bike lane, or other locations where vehicles are likely parked. These vehicles may be marked as possibly parked if they have other characteristics of a parked vehicle. If the vehicles remains possibly parked, for example if it continues to have the characteristics of a parked vehicle, for a set amount of time, it may then be identified as parked. The system may set the number of conditions be met and the required length of time for these conditions to remain unchanged.

These vehicles that are determined to meet the required number of conditions are tracked to ensure that the state of the vehicle and its surroundings remains consistent with the original determination for the required time period. If a change is detected in the state of the vehicle and/or its surroundings within the time period, the system may again determine whether or not the detected vehicle is still parked, possibly parked, or unparked based on the new conditions.

If the requisite time period elapses without a change to the possibly parked status, the detected vehicle may be labeled as parked. Similar to when vehicles are being monitored after satisfying the conditions mentioned above, the parked vehicles are continually tracked to detect any changes in the visual indicia or the conditions. If a certain amount of changes occur with respect to a parked vehicle, the parked label may be removed from the detected vehicle in exchange for an unparked label. This may involve reevaluating whether or not the vehicles satisfy the conditions of a parked vehicle. In addition, the parking status histories of parked vehicles may be used to assess whether the detected changes are significant enough to warrant a change in status. For example, if a detected vehicle was first labeled as possibly parked, then labeled as parked for a second or two, a relatively small movement afterwards may not be enough to change the label of the vehicle to unparked. A vehicle with such a history that starts to move is likely adjusting its parking job.

Depending on the identification detected vehicles or change thereof, an autonomous vehicle may be directed to react accordingly. The features described above may allow for an autonomous vehicle to properly identify stationary vehicles that are parked and therefore may be passed. They may also quickly identify when a previously parked vehicle is no longer parked and therefore needs to be treated differently than a parked vehicle. As such, these features may be especially useful for an autonomous vehicle that can navigate the streets without incidence or assistance. Namely, they would be useful to avoid false negatives and false positives. By using this method, the autonomous vehicle would not stop behind a parked vehicle and will stop for unparked vehicles.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semi-autonomous (some input from a driver) driving modes.

Figure 2:
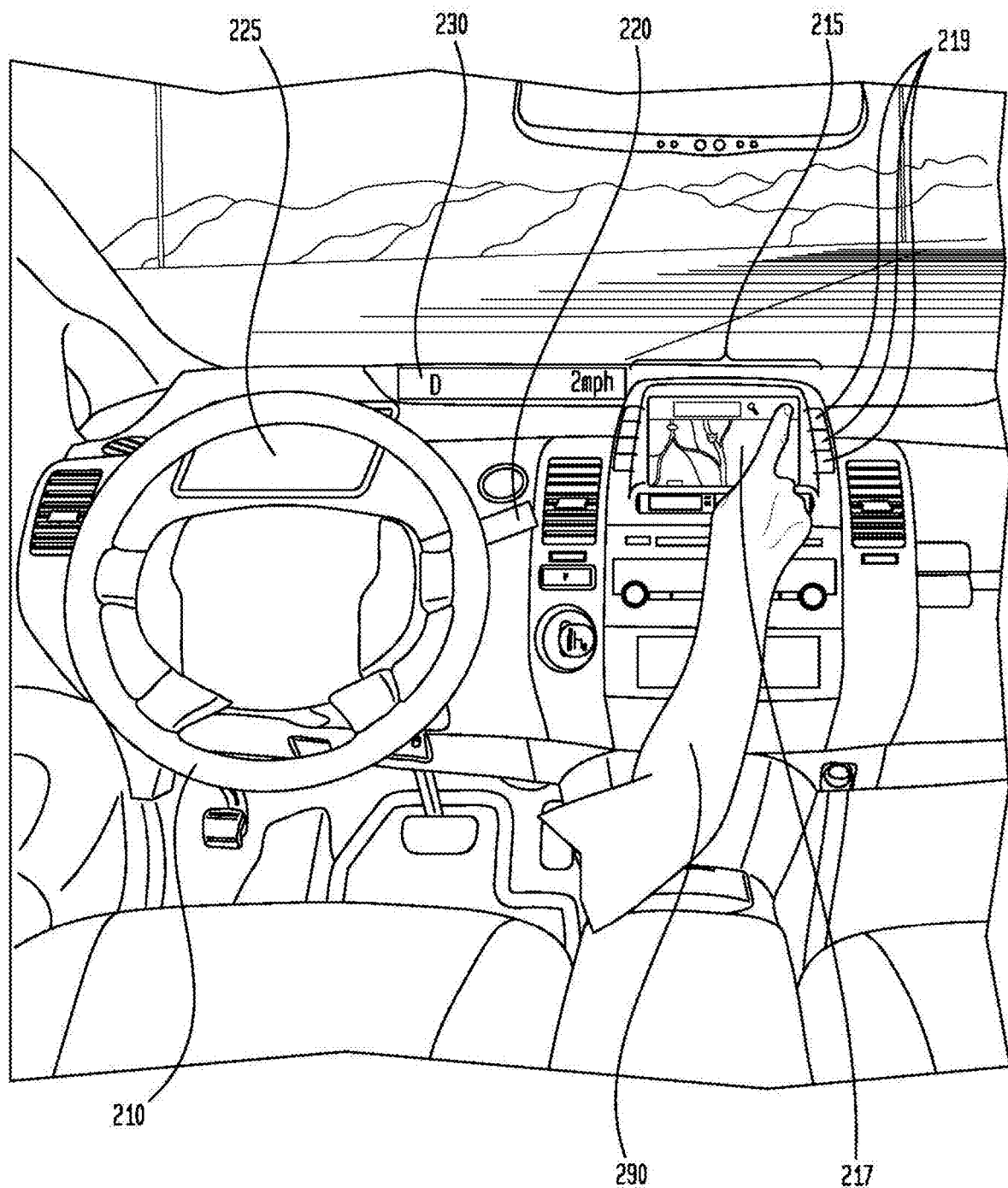
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the computing device 110.

Returning to FIG. 1, when engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, or other such objects and information.

Further, the positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 may include one or more components for detecting and performing analysis on objects external to the vehicle such as other vehicles, obstacles in the roadway, traffic signals, signs, trees, etc. Characteristics such as colors and words may also be detected by one or more components of the perception system 172. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers. The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g., by lighting turn signals of signaling system 166).

Figure 3:
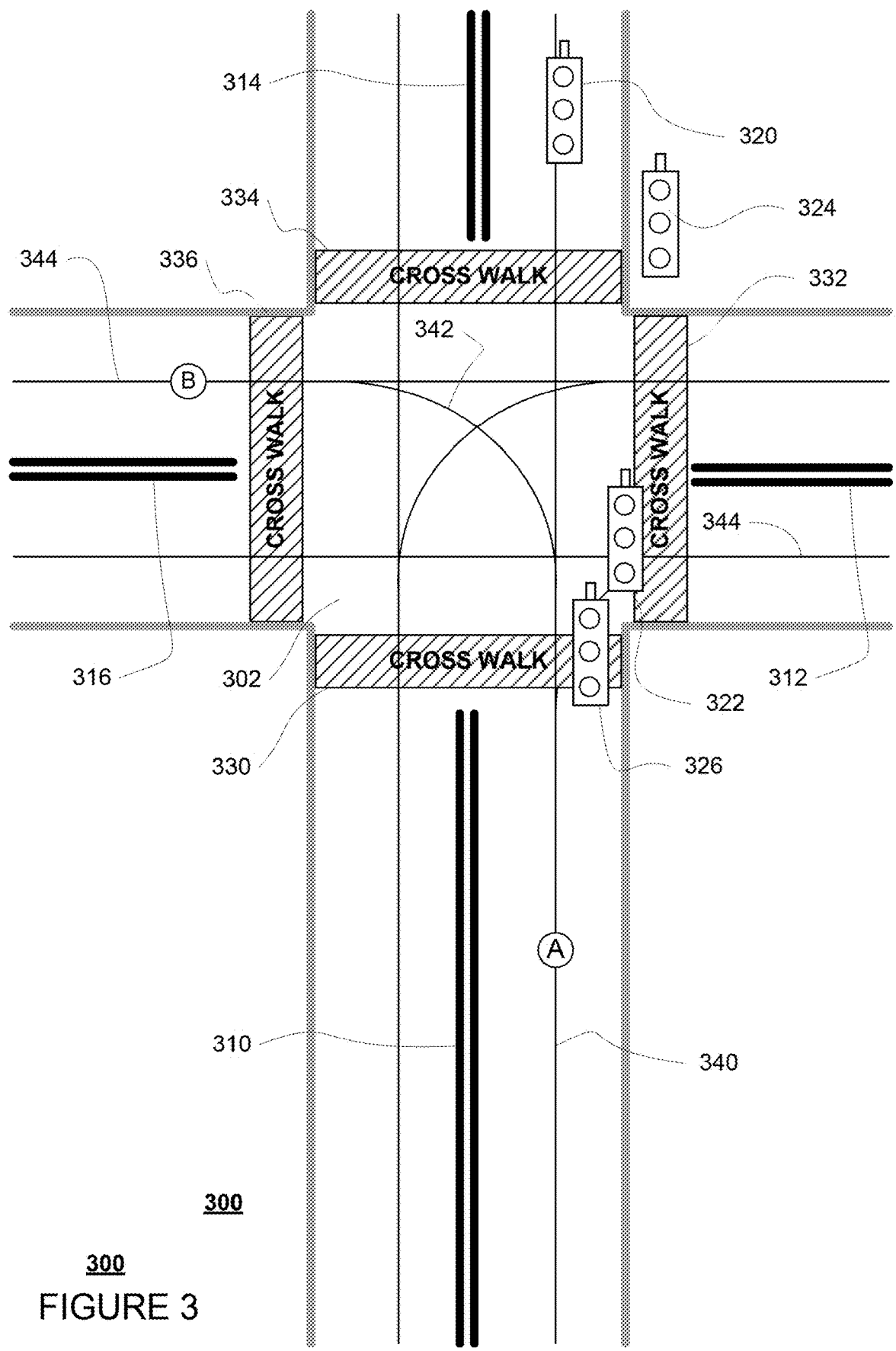
FIG. 3 is an example of detailed map information in accordance with aspects of the disclosure.

FIG. 3 is an example of detailed map information 300 for a section of roadway including an intersection 302. In this example, the detailed map information 300 includes information identifying the shape, location, and other characteristics of lane lines 310, 312, 314, 316 traffic signals 320, 322, 324, 326, crosswalks 330, 332, 334, 336. Although the examples herein relate to a simplified three-state traffic signals, other types of traffic signals, such as those for right or left turn only lanes may also be used.

In addition, the detailed map information may include a network of rails, including rails 340, 342, 344, which provide the vehicle's computer with guidelines for maneuvering the vehicle so that the vehicle follows the rails and obeys traffic laws. As an example, a vehicle's computer may maneuver the vehicle from point A to point B (two fictitious locations not actually part of the detailed map information) by following rail 340, transitioning to rail 342, and subsequently transitioning to rail 344 in order to make a left turn at intersection 302.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

Figure 4:
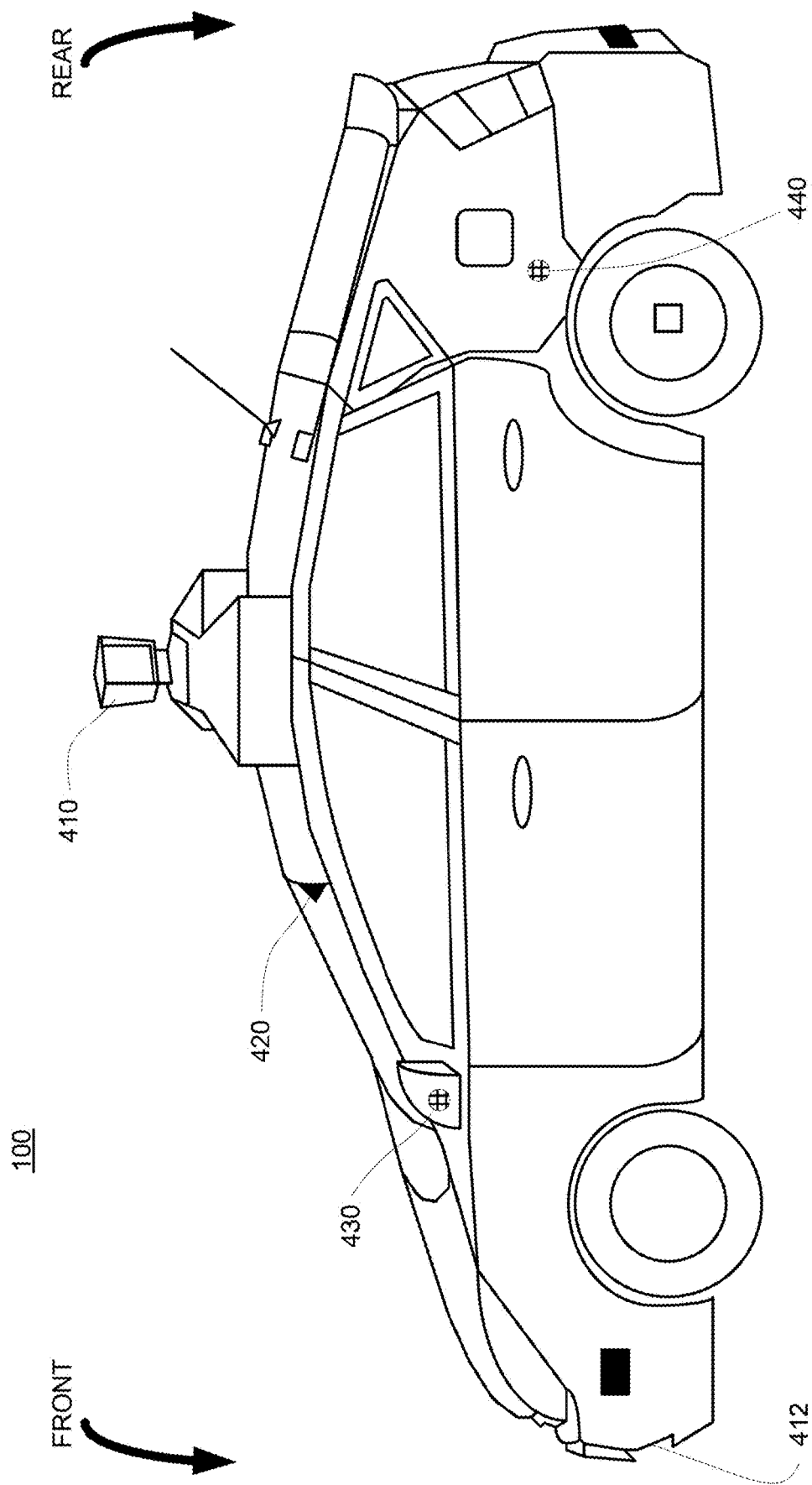
FIG. 4 is an exterior of an autonomous vehicle in accordance with aspects of the disclosure.

FIG. 4 is an example external view of vehicle 100 described above. As shown, various components of the perception system 172 may be positioned on or in the vehicle 100 in order to better detect external objects while the vehicle is being driven. In this regard, one or more sensors, such as laser range finders 410 and 412 may be positioned or mounted on the vehicle. Sensors of the same or different type may be placed on the side mirrors or along the sides of the vehicle, such as sensors 430 and 432, to better detect objects on either side of vehicle 100. As an example, the one or more computing devices 110 may control laser range finder 410, e.g., by rotating it 180 degrees. In addition, the perception system may include one or more cameras 420 mounted internally on the windshield of vehicle 100, or elsewhere, to receive and analyze various images about the environment. Other detection devices, such as sonar, radar, GPS, etc., may also be positioned in a similar manner. The detection devices may be used to track the position, size, and velocity of external objects, such as other vehicles or pedestrians, in the vicinity of the vehicle 100.

The one or more computing devices 110 may also include features such as transmitters and receivers that allow the one or more devices to send and receive information to and from other devices. For example, the one or more computing devices may determine information about the current status of a traffic signal light as well as information about when the status of the traffic signal light changes (from green to yellow to red to green). The one or more computing devices may send this information to other computing devise associated with other vehicles. Similarly, the one or more computing devices may receive such information from other computing devices. For example, the one or more computing devices may receive information about the current status of a traffic signal light as well as information about when the status of the traffic signal light changes from one or more other computing devices associated with other autonomous or non-autonomous vehicles. As another example, the one or more computing devices may receive such information with devices associated with the traffic signal lights. In this regard, some traffic signal lights may include transmitters that send out information about the current status of a traffic signal light as well as information about when the status of the traffic signal light changes.

This information may be sent and received via any wireless transmission method, such as radio, cellular, Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
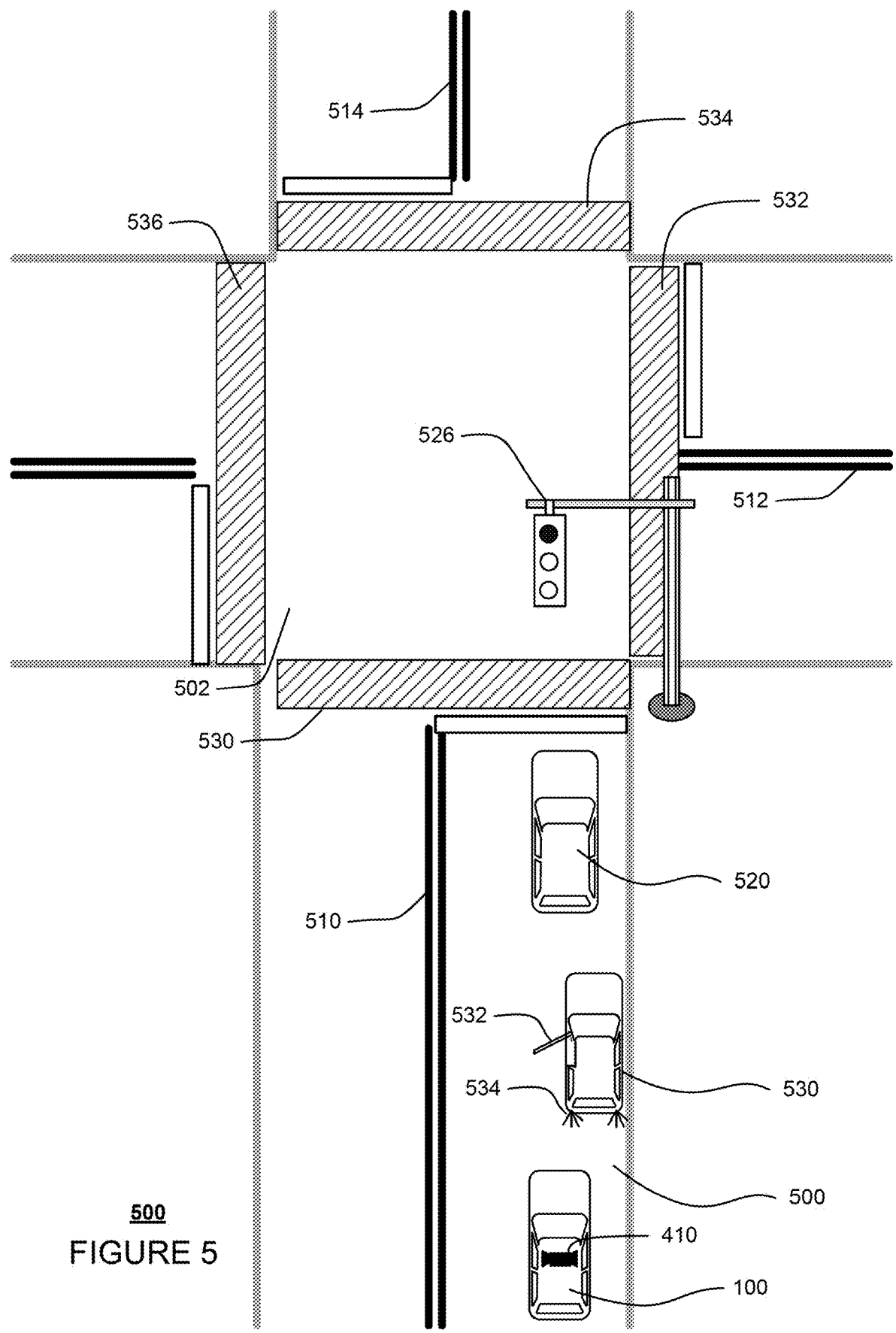
FIG. 5 is an example diagram of a section of roadway including an intersection in accordance with aspects of the disclosure.

As noted above, a vehicle's one or more computing devices may maneuver the vehicle using the various systems described above. For example, FIG. 5 depicts a section of roadway 500 including an intersection 502. Autonomous vehicle 100 is approaching intersection 502 and may be controlled in an autonomous driving mode.

In this example, intersection 502 corresponds to the intersection 302 of the detailed map information 300. In this regard, lane lines 510, 512, and 514 correspond to the shape, location, and other characteristics of lane lines 310, 312, and 314, respectively. Similarly crosswalks 530, 532, 534, and 536 correspond to the shape, location, and other characteristics of crosswalks 330, 332, 334, and 336, respectively and traffic signal 526 corresponds to the shape, location, and other characteristics of traffic signal 326. For simplicity, only a single traffic signal 526 is shown, though other traffic signals corresponding to the shape, location, and other characteristics of traffic signals 320, 322, and 324 may also exist.

Autonomous vehicle 100 may detect surrounding objects and track their movements. In addition, autonomous vehicle 100 may identify whether a particular object is a mobile object, meaning that the object is capable of moving. Autonomous vehicle 100 may also identify whether a mobile object is currently stationary. For example, autonomous vehicle 100 may use laser range finder 410, as well as other sensors and cameras, to detect vehicles 520 and 530, to identify those vehicles as automobiles, and to determine that the vehicles 520 and 530 are currently stationary.

In accordance with one aspect of the disclosure, autonomous vehicle 100 may also determine the type of stationary state of the detected mobile objects. For example, autonomous vehicle 100 may identify vehicles 520 and 530 as being automobiles that are in either a short-term stationary state or a long-term stationary state. In accordance with one aspect, the short-term stationary state may indicate that the object is merely stopped in the flow of traffic and will likely soon begin moving, while the long-term stationary state may indicate that the automobile is parked in a parking spot and will likely not begin moving with traffic in the near future.

To determine whether a vehicle is parked, an autonomous vehicle may determine whether detected vehicles have any visible indicia associated with a particular type of stationary state (e.g., parked). The autonomous vehicle may use any number of visible indicia by determining whether each detected indicium weighs in favor of the vehicle being parked or not. Lights such as hazard lights, emergency vehicle lights, construction warning lights, turn signals, brake lights, and reverse lights may be detected and identified. For example, as autonomous vehicle 100 approaches vehicle 530, it may detect, using one or more of the sensors or cameras described above, that door 532 of vehicle 530 is currently open. In addition, autonomous vehicle 100 may detect that hazard lights 534 of vehicle 530 are flashing.

The autonomous vehicle may also identify one or more traffic control factors relating to the detected vehicles. These factors may include location of a vehicle, type of roadway, type of intersection, lane of travel, location of parking spaces, or other traffic pattern in which the vehicle is currently positioned. To determine the location of the vehicle, the autonomous vehicle may compare the detected stationary vehicles with map data. For example, as autonomous vehicle 100 may determine that vehicle 530 is positioned near curb 540.

The location of the vehicle in relation to the map data may then be used to determine the type of roadway, intersection, or lane of travel in which the stationary vehicle is currently located. In addition, the map data may include the location of parking spaces and no park zones, the color of the curb, city ordinances regarding parking (e.g., whether blocking one's own driveway is legal), or other information related to parking. This information included in the map data may be associated with a vehicle based on its determined location.

If the autonomous vehicle determines that one or more detected vehicles are located in a designated parking space, the autonomous vehicle may determine that the vehicle is in a parked state. These detected vehicles may be labeled as parked in the system. Designated parking spaces may be parking spaces or parking lots delineated on the map data, but may also include areas where curbside parking is permitted. For example, vehicles that are close to a curb and also outside a specific distance from an intersection may be labeled as parked since they are likely pulled over and parked in a curbside parking area. The acceptable distance away from an intersection to park ranges depending on the layout of the intersection. Many distances may fall between 50 and 100 feet, but may also be shorter or longer. Various indicators may be used to determine what the acceptable distance is for a particular intersection; for example, where a solid line delineating a shoulder becomes a dotted line and where the curb color indicates parking is not permitted. Relevant city ordinances may also be referenced by the system to determine whether the area where the vehicles are stopped is a parallel parking area. The ordinances may determine parking based on factors such as the day of the week and the time of day.

As shown in FIG. 5, an autonomous vehicle 100 may determine that vehicle 530 is positioned near curb 540 an acceptable distance away from intersection 502. It may also be determined that a city ordinance permits parallel parking on roadway 500 on weekends and that today is a Saturday. Based on this determination, vehicle 530 may be labeled as parked in the system. However, a vehicle stopped in a shoulder or bike lane close to an intersection may be preparing to turn onto the cross street or otherwise likely to move again in a short period of time. For example, as autonomous vehicle 100 approaches intersection 502, it may determine that vehicle 520 is currently stationary and that vehicle 520 is positioned just outside of intersection 502. Because vehicle 520 is not an acceptable distance from the intersection 502, it may not be labeled as parked at this instance. Additionally, a vehicle stopped in roadway 500 on a weekday also would not initially be labeled as parked because no parking is permitted at that time. In such a case, the acceptable distance may be set as the length of the roadway 500 on weekdays so that essentially there is no acceptable distance away from the intersection 502 a vehicle may be parked. Vehicles stopped where no parking is permitted along a roadway are likely only temporarily stopped, and therefore the autonomous vehicle initially may not label such vehicles as parked.

The autonomous vehicle may also label one or more of the detected vehicles as being in a parked state after they display characteristics of a parked vehicle for a period of time. In one embodiment, a vehicle may first be marked as possibly parked if it is not in a designated parking space as discussed above, but has other characteristics of a parked vehicle at that point in time. Afterwards, if the vehicle remains possibly parked for a set amount of time, it may be labeled as a parked vehicle. For example, a vehicle may be labeled as parked if at least two of the following conditions are met for a length of time as determined based on perception system data and the map data of the detected area. The conditions may include (1) being within a certain distance from a side of a road; (2) being a certain distance away from an intersection; (3) being stationary for a certain length of time; (4) having or lacking specific visual indicia; (5) facing a certain angle in relation to the side of a road; (6) having a person exit the vehicle from the driver's side; (7) leaving a certain amount of space on a side of the vehicle for passing vehicles; (8) being at a type of intersection that does not require slowing or stopping; (9) being at a location where it is legal to park; (10) being in a group with other stationary vehicles that are stopped within a certain distance and at the certain angle from the side of a road; and (11) having no significant changes in position as determined by the detection devices. It should be understood that these conditions are examples, and not an exclusive list of conditions.

(1) Being within a Certain Distance from a Side of the Road.

If a vehicle is stopped close to the side of a road, then it is probably parallel parked. Generally, the closer to the curb the detected vehicle is the more likely that the detected vehicle is parked. Depending on the size and configuration of the road as determined based on the map data, the threshold distance required for satisfying this condition may vary. For example, if the road is a wide, multi-lane road, a vehicle being within 2 to 3 feet of the curb may satisfy this condition. Whereas if the road is a narrow, single-lane road, the proper range where this condition would be met may be 1 foot or less. Additionally, if the road has an unpaved shoulder, the threshold distance may be a distance may be one that places a vehicle within the unpaved portion.

(2) Being a Certain Distance Away from an Intersection.

Being a certain distance away from the intersection also raises the probability that a vehicle is parked. Vehicles stopped close to an intersection are most likely preparing to enter the intersection, but are required to stop because of some other reason. In addition, as discussed previously, parallel parking on along a street is often only permitted a specified distance away from the intersection. Therefore, the threshold distance for a particular location may depend on the type of intersection or the local laws governing the road. The type of intersection may include the type of traffic control at the intersection, if any. In some examples, the threshold may be 50 feet and in others it may be 100 feet. In yet other examples the threshold may be shorter, longer, or somewhere in between. As shown in FIG. 5, vehicle 530 may be stopped outside the threshold distance and therefore satisfies this condition, while vehicle 520 may be within the threshold distance. This condition may not be used in the determination in certain roadways. For example, in some residential streets, cars may be parked right at the edge of the intersection. On these streets, this condition may not be applied in the determination of whether detected vehicles are parked.

(3) Being Stationary for a Certain Length of Time.

Regarding the period of time a vehicle has remained stationary, the longer the vehicle has been stopped, the more likely the vehicle is parked. The autonomous vehicle may access data for the stationary vehicles from the perception system to determine whether the vehicle has been stationary not only at the present moment, but for an extended period of time prior. Depending on the speed the vehicle was traveling prior to stopping, the threshold length of time required to satisfy this condition may vary. For example, the threshold for factoring in favor of being parked is longer when a car was previously traveling at a high speed than a low speed. By way of example, to be considered likely parked, cars previously traveling at high speed may need to be stationary for between 10 and 30 seconds or more, whereas cars previously traveling at a low speed need only be stationary for around 5 seconds.

(4) Having or Lacking Specific Visual Indicia.

The presence or absence of certain visual indicia may be another indication that a stationary vehicle is parked. For example, the presence of emergency vehicle lights or construction warning lights may indicate that a vehicle is parked. However, if hazard lights, brake lights, reverse lights, or turn signals of the vehicle are on, the vehicle is probably not parked because such a signal often indicates that a vehicle may soon begin moving again. It follows that the absence of such lights may weigh in favor of a vehicle being parked. Therefore, if the computing devices detect emergency vehicle lights or other lights indicative of a parked vehicle, then this condition may be satisfied. Additionally, the absence of brake lights or other lights considered indicative of a vehicle in the flow of traffic may also satisfy this condition. Vehicle 530 has hazard lights 534 on, so based solely on the hazard lights as visual indicia, this condition is not satisfied. However, other visual indicia besides lights may be taken into account; for example, the position of a vehicle's doors. In FIG. 5, driver's door 532 of vehicle 530 is open. This visual indicium may be enough to satisfy this condition.

If hazard lights, brake lights, reverse lights, or turn signals are detected, the autonomous vehicle may then determine whether or not a vehicle is in fact stalled, and therefore not likely to move in the near future. A method such as the one described in U.S. patent application Ser. No. 14/523,253, which is incorporated by reference herein, may be used for this purpose.

(5) Facing a Certain Angle in Relation to the Side of a Road.

Facing a certain angle in relation to the side of a road may indicate that a vehicle is parked in a parallel parking spot, an angled parking spot, or a head-in parking spot, even if it is not a delineated parking spot in the map data. The headings of the stationary vehicles in relation to the street may be compared with the direction of the street and the position of the curb. If the car heading is parallel, orthogonal, or at a particular angle to the curb (e.g., approximately 30 degrees), the system may consider this condition satisfied because they correspond to parallel parking, head in parking, or angled parking, respectively. Both vehicle 520 and 530 have headings that are parallel to the roadway 500. For a curved road, the curvature is taken into account to increase both heading and distance tolerances. In other words, the range of headings that would satisfy this condition may be greater for roads with greater curvatures. However, specifically with respect to cul-de-sacs, roads with large shoulders, and other street layouts in which vehicles are often parked with no consistent heading, this heading factor and tolerance may not be considered in the determination of whether or not a vehicle is parked.

(6) Having a Person Exit the Vehicle from the Driver's Side.

The autonomous vehicle may consider the behavior and location of people around a stationary vehicle to determine whether or not the vehicle is parked. This condition for the identification of parked vehicles may be satisfied when one or more people located around the vehicle behave in specified ways. For example, if a person exits out of the vehicle from the driver's side, this condition may be satisfied. If a person had exited vehicle 530, leaving door 532 ajar, this condition would be satisfied. On the other hand, if a person exits from the passenger side or enters the vehicle, this condition may not be satisfied. If a person is in or next to a crosswalk in front of the stationary vehicle, this condition also may not be met.

(7) Leaving a Certain Amount of Space on a Side of the Vehicle for Passing Vehicles.

Another condition that may be used to determine parked vehicles is having a minimum amount of space on the non-curb side of the vehicle. Using map data about the lane width and presence of other boundaries of the road, the system may determine that there is enough space on the non-curb side of the vehicle for another vehicle to pass by. The system may allow for a slight breach of the center of the road (often marked with a lane marker or yellow boundary) depending on the type of marker or boundary (e.g., no more than half the width of the car for a solid yellow boundary) in areas of the map, such as residential areas, where the practice is common. The threshold for the minimum amount of space on the side of a stopped vehicle closer to the roadway may therefore vary based on the width of the road, the type of road or location, and the average size of vehicles that travel that road. If the space on the non-curb side of the stationary vehicle meets the threshold, the vehicle is probably parked. For example, vehicle 530 in FIG. 5 is far enough to the right side of the roadway 500 to leave room on the other side for most vehicles to pass. On the other hand, vehicle 520 is parked further in the middle of roadway 500 and therefore may not leave enough room for another vehicle to pass.

(8) Being at a Type of Intersection that does not Require Slowing or Stopping.

A vehicle stopped near an intersection that does not require stopping or slowing is probably parked. In other words, determining whether a stationary vehicle is parked may also include determining the type of intersection by which it is stopped. In particular, the system may use the map data to identify the type of intersection near the stopped vehicle. For example, if the intersection is one with a stop sign, stop light, yield, or other type of intersection that may require a vehicle to stop before continuing in the flow of traffic, the detected vehicle is likely not parked. On the other hand, if the intersection is unregulated or if the traffic light is green, the stationary vehicle is more likely parked and may satisfy this condition. This condition may further require that no vehicles be crossing the intersection via the cross street to ensure that a vehicle is not stopped at the intersection merely to let another vehicle clear the intersection before driving through it.

However, this condition may not be considered if the stationary vehicle is a certain distance away from the intersection because the movement of a vehicle far away from an intersection would not be greatly affected by the type of intersection. As such, in one embodiment, it may first be determined by the perception system whether a vehicle is a certain distance away from the intersection. This threshold distance may be different from the threshold distance related to the condition of being a certain distance away from an intersection mentioned above. If the vehicle is within the threshold distance, then the system may evaluate whether this type of intersection condition is satisfied. Vehicle 520 may be within the threshold distance for roadway 500. The perception system may then detect that the intersection has a traffic light 526 that regulates the traffic in the relevant lane of travel. In addition, the system may detect that the traffic light is currently red. As such, vehicle 520 does not satisfy this condition.

(9) Being at a Location where it is Legal to Park.

The legality of parking in a specified area may be determined by detecting the presence specific features of the roadway and by referring to the city ordinances from the map data in relation to the detected features. Features may be detected by the perception system of the autonomous vehicle and may include fire hydrants, no parking signs, driveways, curbs painted a particular color (e.g., red), and bike lanes. For example, some cities allow for parking in the bike lanes after a certain time of day on certain days of the week. Therefore, if a vehicle is detected stopped in a bike lane after 5:00 pm on a Saturday, when parking is permitted there, the condition of being at a location where it is legal to park may be satisfied.

(10) Being in a Group with Other Stationary Vehicles that are Stopped within a Certain Distance and at the Certain Angle from the Side of a Road.

The detection of other nearby vehicles may also factor in to the determination that the vehicle is parked. If more than one car is stopped at a similar heading along the same curb in the proximity of the stationary vehicle, the uniformity of their positioning may indicate that it is likely that the cars are parked. As such, when a group of such vehicles are detected by the perception system of the autonomous vehicle, this condition may be satisfied regarding the vehicles in the group. Additionally or alternatively, if it is detected that several vehicles are navigating around a stationary vehicle, the autonomous vehicle may determine that the stationary vehicle is likely parked. Otherwise, if there is no other cars similarly stopped in the area or if several cars in the flow of traffic are stopping behind a stationary vehicle, this condition may not be met.

(11) Having No Significant Changes in Position as Determined by the Detection Devices.

Even if a stationary vehicle was in motion short prior to being stopped, it may still be considered parked if the motion was insignificant. Insignificant motions include small changes in position, extremely low speed movements, and changes in position that are not likely to affect the flow of traffic. For example, the perception system may have observed a change in the observed extent of a vehicle within a short time period prior to the vehicle becoming stationary. If this change was smaller and/or happened slower than a set threshold, it may be deemed insignificant and therefore this condition may be satisfied. However, if shortly before a vehicle stopped moving, the sensors of the autonomous vehicle went from detecting only the rear portion of a stationary vehicle to, a second later, detecting part of the side portion of the vehicle, this may be considered a significant change and the condition may be unmet. A vehicle displaying this sort of change be backing up out of a spot or jutting out more into the roadway. Additionally or alternatively, the sensors of the autonomous vehicle, such as a radar, may measure the relative velocity directly and detect any significant changes using the measurement.

One, more than one, or none of the aforementioned conditions may be used by an autonomous vehicle to determine if the detected vehicles are possibly parked. The conditions mentioned may also be formulated differently than how they are described above. For example, in some examples, one of the aforementioned conditions may be implemented as more than one condition.

If, having evaluated whether stationary vehicles satisfy the conditions of parked vehicles, the detected vehicles are determined to be possibly parked, the perception system tracks these vehicles for a short time period to ensure that the state of the vehicle and its surroundings remains consistent with the original determination. If a change is detected in the state of the vehicle and/or its surroundings within the time period, the system may again determine whether or not the detected vehicle is still parked, possibly parked, or unparked based on the new conditions. In one embodiment, a vehicle may be considered unparked if two or more conditions of a parked vehicle are no longer satisfied after the changes are taken into account. Detecting significant changes in the size and shape of the detected portion of a vehicle as well as the speed of a vehicle is particularly important as these changes are strongly indicative of a vehicle in the process of unparking. The threshold for these changes to be considered significant may be small in order to allow for the proper level of sensitivity in the system to these changes.

In some examples, the time period required before a vehicle is deemed as parked is dependent on the speed of the vehicle prior to it stopping. The faster the vehicle was traveling before, the longer the time required before the system meets the designated threshold for labeling the vehicle as parked. Once the requisite time period has elapsed without a change to the possibly parked status, the detected vehicle may be labeled as parked.

After the detected vehicle is labeled as parked, the system continues to track the vehicle with its sensors and detection devices to detect any changes in the visual indicia or the conditions. If a certain amount of changes occur with respect to a parked vehicle, the parked label may be removed from the detected vehicle. In one example, this may be determined based on a likelihood value of whether the vehicle is unparking. In an alternate example, unparking may be determined based on an evaluation of the conditions mentioned previously with respect to identifying parked vehicles. Any change in these conditions may constitute a change in condition that would require a reevaluation of whether or not the vehicle is still parked. As discussed previously, the perception system may be calibrated to be particularly sensitive to changes to the size and shape of the detected portion of a vehicle and the speed of a vehicle. In addition, the perception system may access the parking status histories of the detected vehicles and weigh the changes in conditions based on the histories. For example, if the detected vehicle was first labeled as possibly parked for a period of time, then labeled as parked for a second or two, a relatively small detected change in condition may not be enough to change the label of the vehicle to unparked. A vehicle with such a history that starts to move is likely adjusting its parking job.

Figure 6:
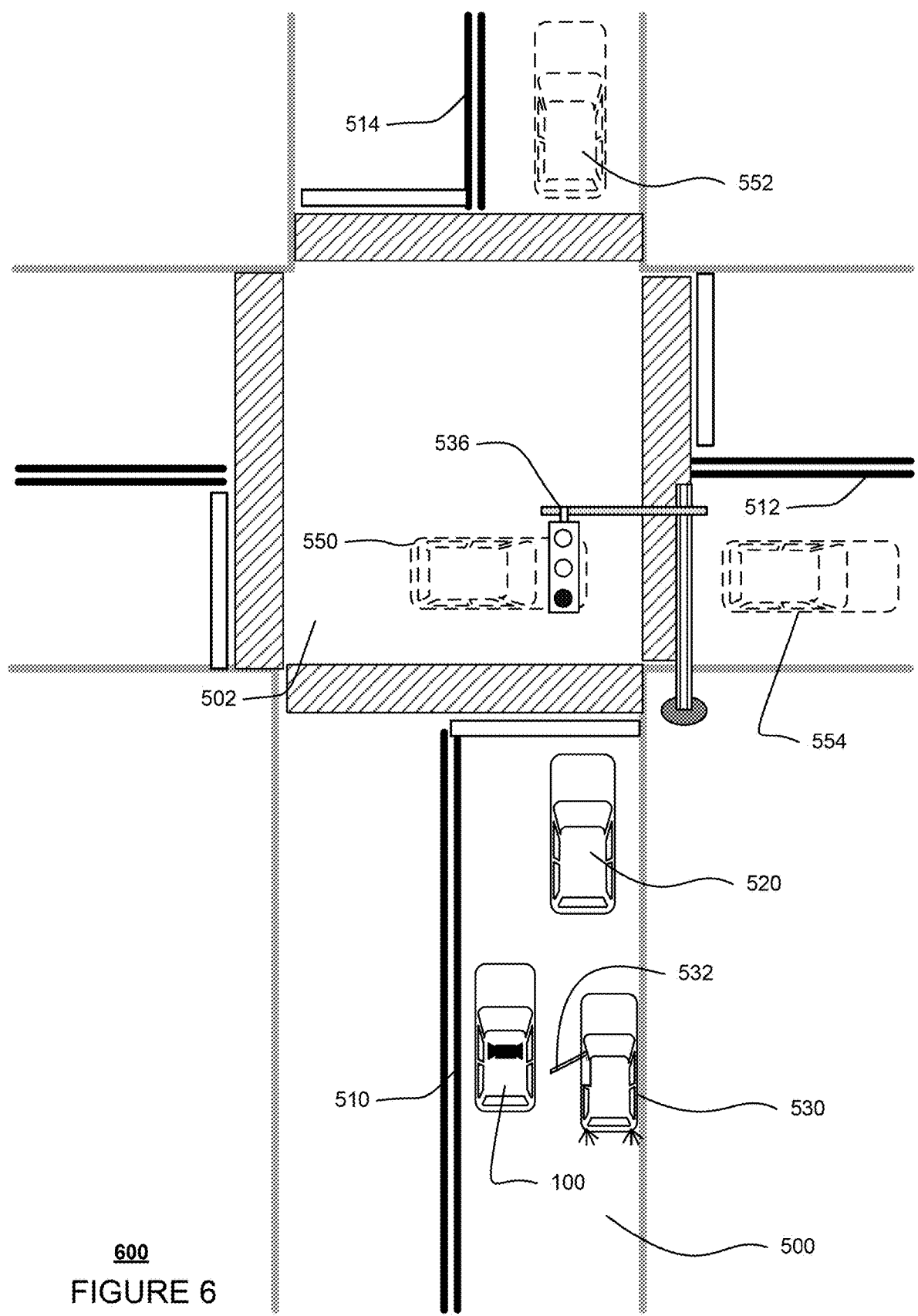
FIG. 6 is another example diagram of a section of roadway including an intersection in accordance with aspects of the disclosure.

However, if the likelihood value of being an unparking vehicle meets a specified threshold or if the vehicle no longer satisfies the conditions of a parked vehicle, the parked label may therefore be removed from the vehicle in the system, and the autonomous vehicle may be directed to react accordingly; for example, stop to let the vehicle out of the spot. Because vehicle 530 satisfied two or more of the aforementioned conditions (and presumably for the requisite amount of time), autonomous vehicle 100 may navigate around as shown in FIG. 6. The aforementioned tolerances and thresholds may be optimizing over large datasets containing parked and moving vehicles either manually or via one or more computing devices.

The autonomous vehicle may continuously detect the vehicles in its vicinity and determine which vehicles in the detected set of vehicles are stationary at a given moment in time and, from the continuously updated set of stationary vehicles, the autonomous vehicle may determine parked and which are unparked.

Figure 7:
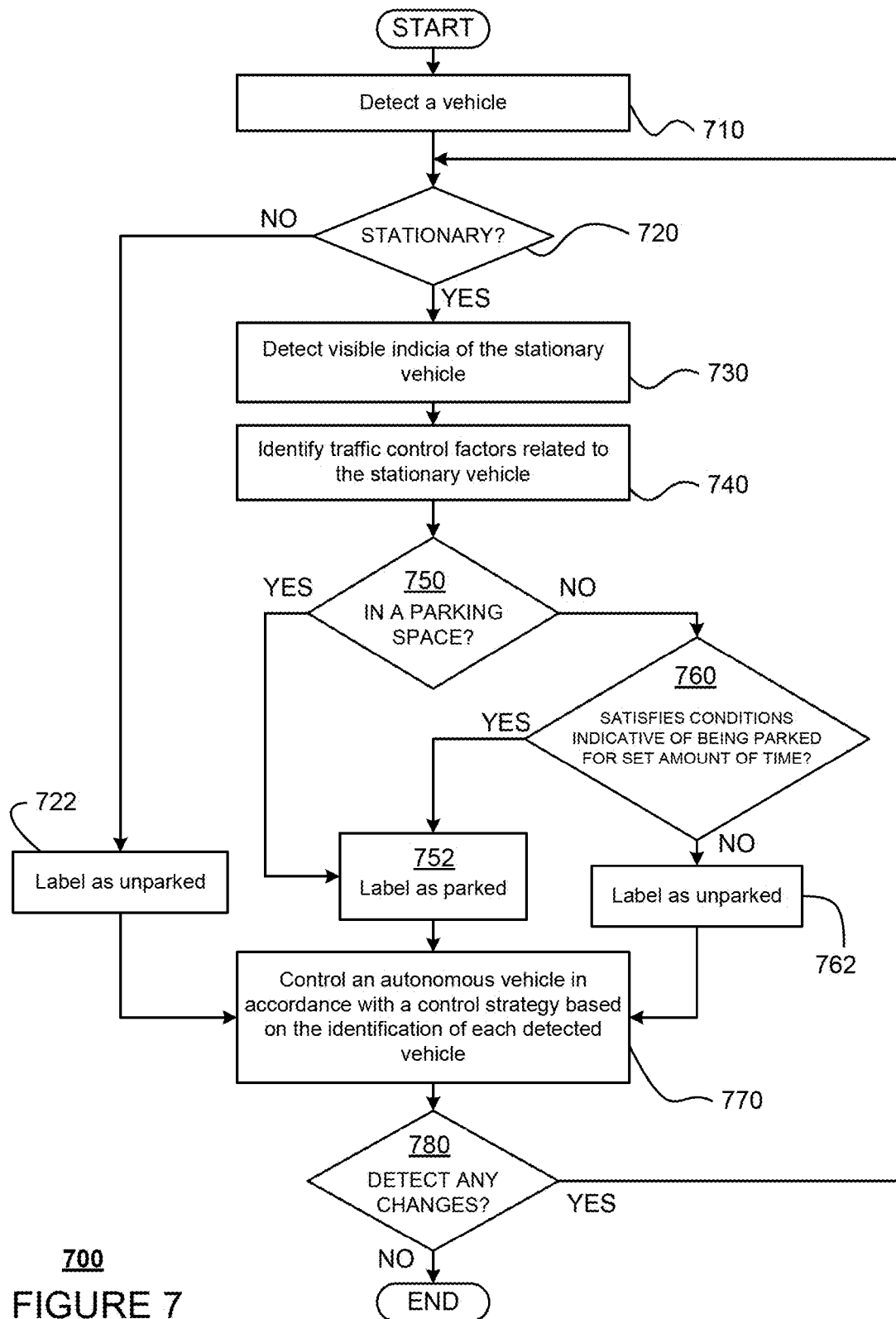
FIG. 7 is an example flow diagram in accordance with aspects of the disclosure.

FIG. 7 is an example flow diagram 700 which depicts some of the aspects described above which may be performed by the one or more computing devices, such as one or more computing devices 110, as vehicle 100 is being autonomously controlled in accordance with a control strategy. Flow diagram 700 may also be performed for each vehicle detected by vehicle 100. In this example, autonomous vehicle 100 may detect another vehicle at block 710. It is determined whether the detected vehicle is stationary at block 720. If the detected vehicle is not stationary, it is marked as unparked at block 722.

If the detected vehicle is stationary, then the autonomous vehicle 100 may detect any visible indicia from the stationary vehicle at block 730 and identify traffic control factors related to the stationary vehicle at block 740. At block 740, it may be determined whether the stationary vehicle is in a parking space. If it is in a parking space, then autonomous vehicle 100 may label it as parked at block 752.

If it is not in a parking space, then it may be determined if the stationary vehicle satisfies two or more conditions indicative of being parked for a set amount of time. If two or more conditions are satisfied for the specified amount of time, then autonomous vehicle 100 may label the stationary vehicle as parked at 752. If two or more conditions are not satisfied, then autonomous vehicle 100 may label the stationary vehicle as unparked.

Based on the whether the detected vehicle is identified as parked or unparked, autonomous vehicle 100 may be controlled in accordance with a control strategy. At block 780, it may be determined whether any changes are detected in the visual indicia, size, shape, velocity, or other characteristics of the detected vehicle or in the traffic control factors. If there are any significant changes, then the detected vehicle is reanalyzed by starting from block 720 again. If there are no significant changes, then the process ends. In this way, autonomous vehicle 100 may update the detected vehicle's stationary state designation, as well as the autonomous vehicle's control strategy.

Some examples above refer to 'set of vehicles' to illustrate how an autonomous vehicle can handle a busy environment with low latency. However, the technique(s) could be used even when the environment includes a single vehicle of course (e.g., a set of one or more vehicles). Additionally, although an autonomous vehicle is discussed herein, the methods and systems may be applied in a vehicle control system of a non-autonomous vehicle (e.g., as part of a driver assistance, cruise control, or safety system).

Unless otherwise stated, the foregoing alternative examples are not mutually exclusive, but may be implemented in various combinations to achieve unique advantages. As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   detecting, by one or more computing devices, a vehicle having zero velocity;
   determining, by the one or more computing devices, the vehicle is parked based on one or more conditions indicative of being parked;
   detecting, by the one or more computing device, a change in state of the detected vehicle;
   determining, by the one or more computing devices, the detected vehicle is no longer parked based on the detected change in state of the detected vehicle; and
   controlling, by the one or more computing devices, an autonomous vehicle in accordance with a control strategy corresponding to the determination that the detected vehicle is no longer parked.

2. The method of claim 1, wherein determining the detected vehicle is no longer parked based on the detected change in state of the detected vehicle includes determining that an amount of change is greater than a threshold amount of change.

3. The method of claim 2, wherein the change in state includes a change in the detected vehicle's size, shape, or speed.

4. The method of claim 2, wherein determining the detected vehicle is no longer parked based on the detected change in state of the detected vehicle includes determining a likelihood value corresponding to the amount of change in the state of the detected vehicle, and the threshold amount of change is a threshold likelihood value.

5. The method of claim 2, wherein determining the detected vehicle is no longer parked based on the detected change in state of the detected vehicle also includes determining the threshold amount of change based on a length of time the vehicle is detected as parked.

6. The method of claim 1, wherein determining the detected vehicle is no longer parked based on the detected change in state of the detected vehicle includes:
   reevaluating the one or more conditions indicative of being parked based on the detected change in state of the detected vehicle, and
   determining the detected vehicle does not satisfy the one or more conditions indicative of being parked.

7. The method of claim 6, wherein reevaluating the one or more conditions includes weighing the one or more conditions based on a length of time the vehicle is detected as parked.

8. A system comprising:
   one or more sensors of an autonomous vehicle; and
   one or more computing devices configured to:
   detect, using the one or more sensors, a vehicle having zero velocity;
   determine the vehicle is parked based on one or more conditions indicative of being parked;
   detect, using the one or more sensors, a change in state of the detected vehicle;
   determine the detected vehicle is no longer parked based on the detected change in state of the detected vehicle; and
   control the autonomous vehicle in accordance with a control strategy corresponding to the determination that the detected vehicle is no longer parked.

9. The system of claim 8, wherein the one or more computing devices are configured to determine the detected vehicle is no longer parked based on the detected change in state of the detected vehicle by determining that an amount of change is greater than a threshold amount of change.

10. The system of claim 9, wherein the change in state includes a change in the detected vehicle's size, shape, or speed.

11. The system of claim 9, wherein the one or more computing devices are configured to determine the detected vehicle is no longer parked based on the detected change in state of the detected vehicle by determining a likelihood value corresponding to the amount of change in the state of the detected vehicle, and the threshold amount of change is a threshold likelihood value.

12. The system of claim 9, wherein the one or more computing devices are configured to determine the detected vehicle is no longer parked based on the detected change in state of the detected vehicle also by determining the threshold amount of change based on a length of time the vehicle is detected as parked.

13. The system of claim 8, wherein the one or more computing devices are configured to determine the detected vehicle is no longer parked based on the detected change in state of the detected vehicle by:
   reevaluating the one or more conditions indicative of being parked based on the detected change in state of the detected vehicle, and
   determining the detected vehicle does not satisfy the one or more conditions indicative of being parked.

14. The system of claim 13, wherein reevaluating the one or more conditions includes weighing the one or more conditions based on a length of time the vehicle is detected as parked.

15. A non-transitory computer-readable medium on which instructions are stored, the instructions, when executed by one or more computing devices cause the one or more computing devices to perform a method, the method comprising:
   detecting a vehicle having zero velocity;
   determining the vehicle is parked based on one or more conditions indicative of being parked;
   detecting a change in state of the detected vehicle;
   determining the detected vehicle is no longer parked based on the detected change in state of the detected vehicle; and
   controlling an autonomous vehicle in accordance with a control strategy corresponding to the determination that the detected vehicle is no longer parked.

16. The medium of claim 15, wherein determining the detected vehicle is no longer parked based on the detected change in state of the detected vehicle includes determining that an amount of change is greater than a threshold amount of change.

17. The medium of claim 16, wherein the change in state includes a change in the detected vehicle's size, shape, or speed.

18. The medium of claim 16, wherein determining the detected vehicle is no longer parked based on the detected change in state of the detected vehicle includes determining a likelihood value corresponding to the amount of change in the state of the detected vehicle, and the threshold amount of change is a threshold likelihood value.

19. The medium of claim 16, wherein determining the detected vehicle is no longer parked based on the detected change in state of the detected vehicle also includes determining the threshold amount of change based on a length of time the vehicle is detected as parked.

20. The medium of claim 15, wherein determining the detected vehicle is no longer parked based on the detected change in state of the detected vehicle includes:
- reevaluating the one or more conditions indicative of being parked based on the detected change in state of the detected vehicle, and
- determining the detected vehicle does not satisfy the one or more conditions indicative of being parked.

* * * * *